United States Patent [19]

Miilu

[11] Patent Number: 5,058,939
[45] Date of Patent: Oct. 22, 1991

[54] POWER LATCH SYSTEM

[75] Inventor: Dean R. Miilu, Canton, Mich.

[73] Assignee: ASC Incorporated, Southgate, Mich.

[21] Appl. No.: 618,871

[22] Filed: Nov. 28, 1990

[51] Int. Cl.⁵ .............................................. E05C 5/02
[52] U.S. Cl. .............................. 292/110; 292/DIG. 5;
292/DIG. 49
[58] Field of Search .............. 292/110, 115, 201, 111,
292/132, DIG. 5, DIG. 49

[56] References Cited

U.S. PATENT DOCUMENTS

| | | | |
|---|---|---|---|
| 2,741,503 | 4/1956 | Thompson, III | 292/251 |
| 2,753,202 | 7/1956 | Smith et al. | 292/144 |
| 2,852,292 | 9/1958 | Galla | 292/25 |
| 2,916,327 | 12/1959 | Gilson | 292/110 X |
| 2,993,731 | 7/1961 | Miles, Jr. | 296/120 |
| 3,004,788 | 10/1961 | Dully et al. | 292/113 |
| 3,089,719 | 5/1963 | Csizmansky | 292/25 |
| 3,266,838 | 8/1966 | Heincelman | 296/121 |
| 3,425,742 | 2/1969 | Rauber, Jr. | 296/121 |
| 3,603,636 | 9/1971 | Carella | 296/137 B |
| 3,610,683 | 10/1971 | Vermeulen | 296/137 E |
| 3,666,317 | 5/1972 | Podwys | 296/116 |
| 3,712,665 | 1/1973 | Klein | 292/DIG. 5 X |
| 3,752,519 | 8/1973 | Nordell et al. | 292/111 |
| 4,132,438 | 1/1979 | Guymer | 292/111 |
| 4,619,480 | 10/1986 | Motoyama et al. | 296/217 |
| 4,626,025 | 12/1986 | Haecker et al. | 296/218 |
| 4,664,436 | 5/1987 | Eyb | 296/121 |
| 4,747,637 | 5/1988 | Lenoir et al. | 296/218 |
| 4,749,193 | 6/1988 | Hacker | 296/107 |
| 4,815,775 | 3/1989 | Mertin et al. | 292/201 |
| 4,819,983 | 4/1989 | Alexander et al. | 296/121 |
| 4,830,426 | 5/1989 | Schlachter et al. | 296/121 |

Primary Examiner—Richard E. Moore
Attorney, Agent, or Firm—Harness, Dickey & Pierce

[57] ABSTRACT

A powered latching device for an automotive vehicle convertible top includes a reversible drive element linked to a latch incorporating a substantially J-shaped keeper for engaging a latch receiving flange portion of the vehicle's windshield header. The modular latching system is mounted to an articulated side rail of the convertible top, and, preferably two such latching systems are employed, one on each side rail of the convertible top.

22 Claims, 3 Drawing Sheets

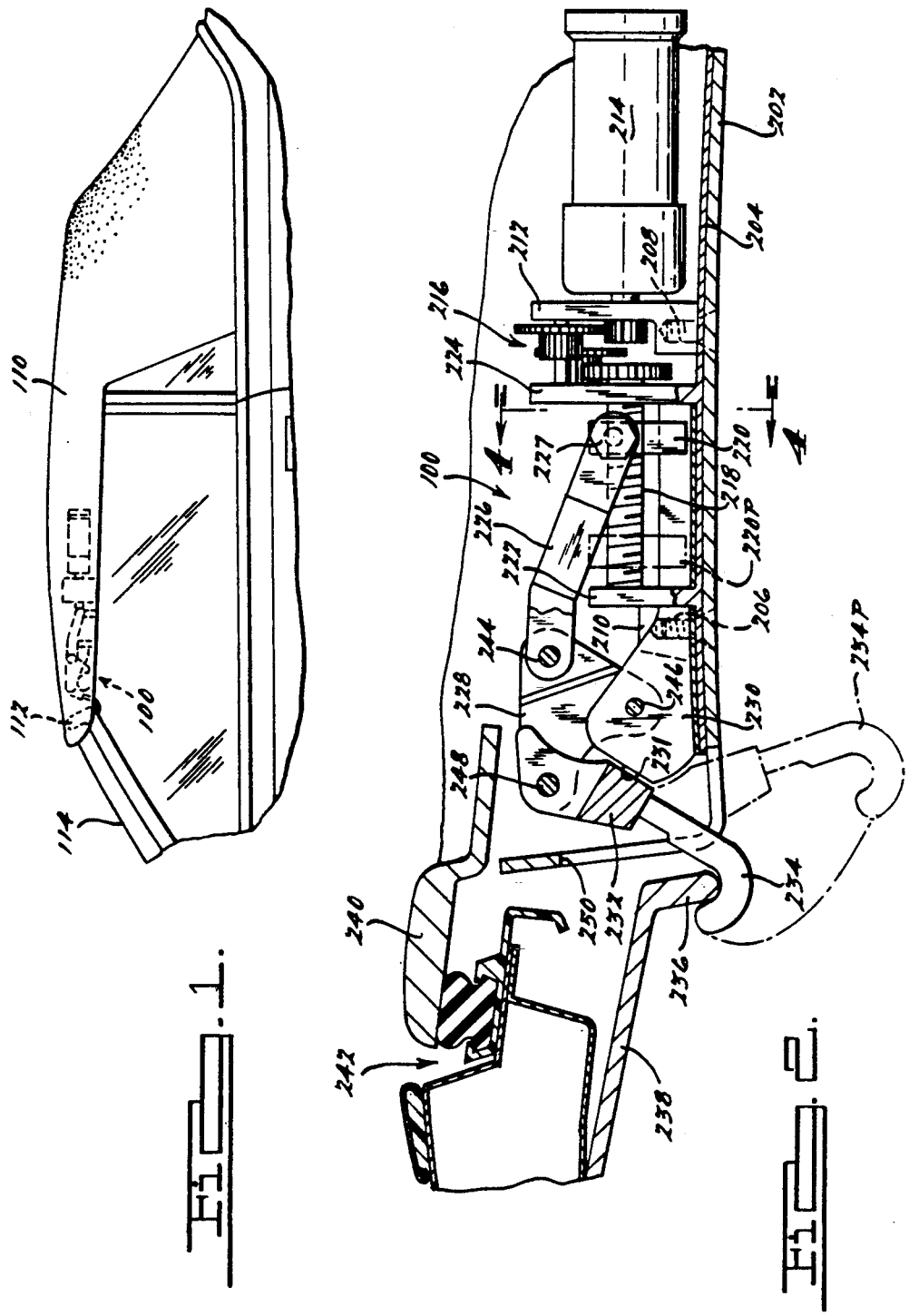

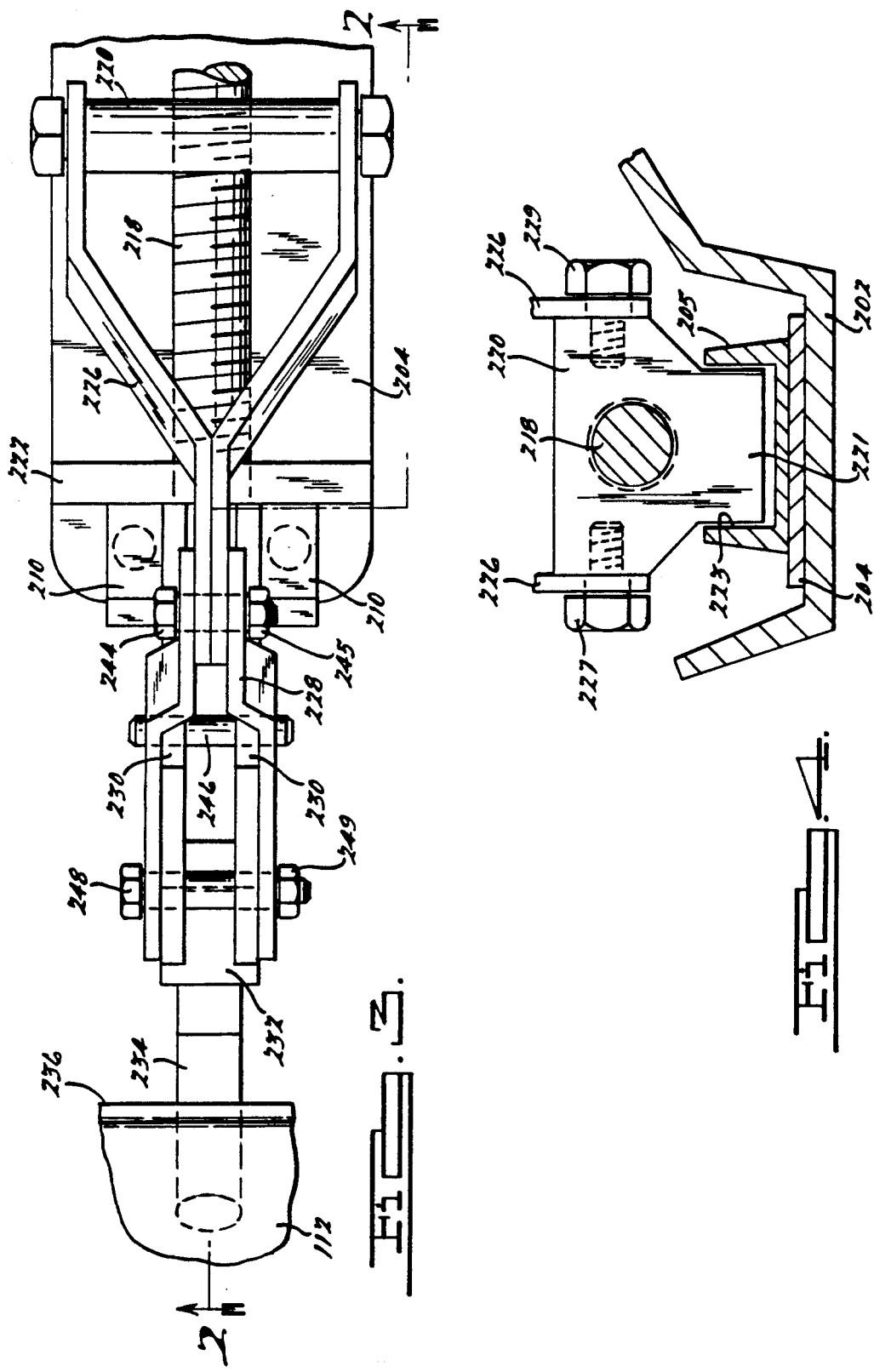

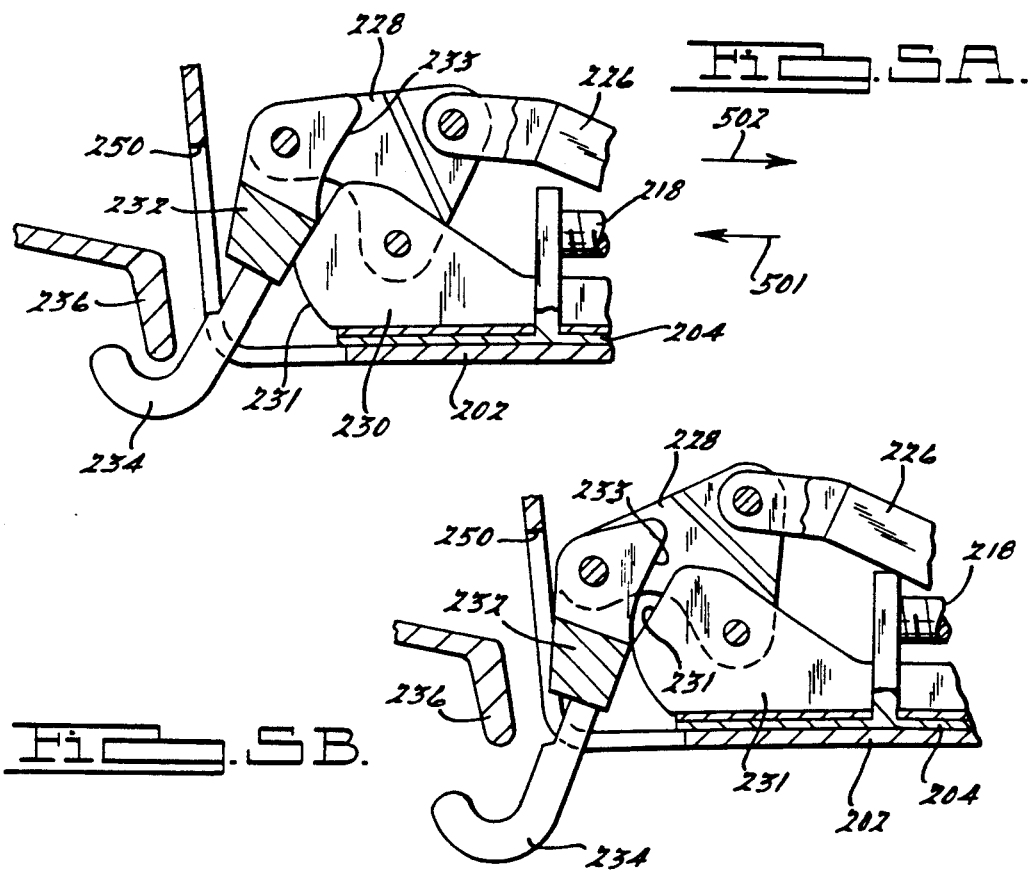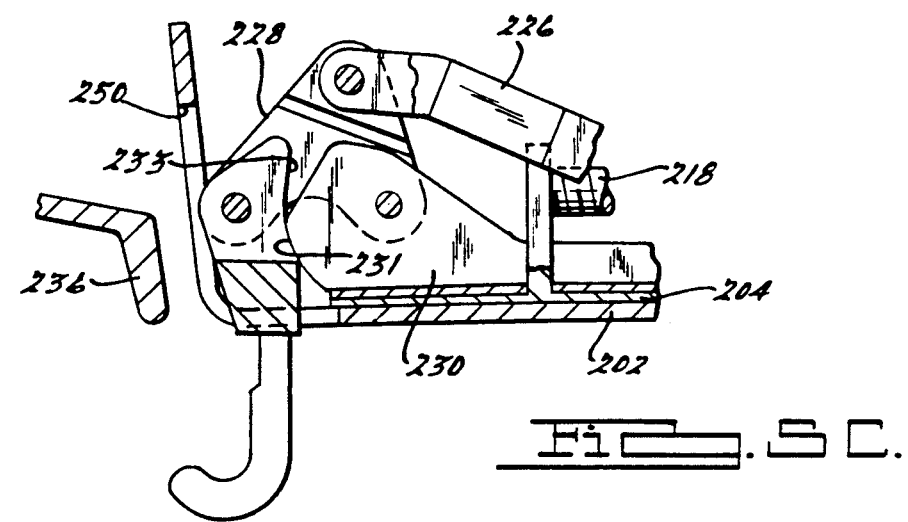

POWER LATCH SYSTEM

BACKGROUND OF THE INVENTION

The invention relates generally to powered latching systems for effecting engagement and disengagement between two members, such as an automobile convertible top and the windshield header of the automobile.

Latching systems are known wherein pins or dowels are mounted to a convertible top header for lowering into receiving cavities formed in the vehicle's windshield header. Alternatively, prior systems may have pins associated with the windshield header which engages cavities in the convertible header. In either case, there have been problems associated with such known arrangements caused by misalignment of the pin and its receiving cavity. Such misalignment may lead to binding up of the parts rendering the latch system either inoperative or in need of expensive repair.

Other known systems have attempted to address the above alignment problems, but only at the price of utilizing complicated and costly arrangements of parts.

Manual and powered latching arrangements using substantially J-shaped hook-type latches are also known, but are not believed to follow the concepts disclosed herein.

There is therefore seen a need for a modular, easily installed powered latch system which will be relatively inexpensive and not prone to malfunction due to misalignment of the latching apparatus.

SUMMARY OF THE INVENTION

Accordingly, the invention contemplates apparatus for effecting powered latching engagement and disengagement between relatively moveable first and second members. The apparatus includes reversible drive apparatus coupled to one of the first and second members, a latch element having a substantially J-shaped keeper, a latch engaging member associated with the other one of the first and second members and shaped for latching receipt of at least a portion of the J-shaped keeper, and a linkage arrangement including a drive link having a first end coupled to the drive apparatus, a rotating element coupled to a second end of the drive link and to the latch, and a cam providing a path-defining guide for the latch element, the drive link operative in cooperation with the drive apparatus to rotate the rotating element about the cam to move the latch element across the cam into and out of latching engagement with the latch engaging element.

BRIEF DESCRIPTION OF THE DRAWING

The objects and features of the invention will become apparent from a reading of a detailed description of an illustrative embodiment, taken in conjunction with the drawings, in which:

FIG. 1 is a side elevational view of an automotive vehicle having a convertible top carrying a power latching apparatus arranged in accordance with the principles of the present invention;

FIG. 2 is an enlarged vertical sectional view through the center of the power latch arrangement of FIG. 1;

FIG. 3 is a top plan view of the apparatus of FIG. 2;

FIG. 4 is a sectional view taken along line 4—4 of FIG. 2; and

FIGS. 5A–5C are side elevational views of the latching element of the apparatus of FIG. 2 in its various operating positions.

DETAILED DESCRIPTION

With reference to FIG. 1, the invention is shown as an assembly 100 mounted in the vicinity of the forwardly movable portion of a convertible top 110 which when in a closed position rests upon a region generally defined by a windshield header 112 of windshield 114. As seen from FIG. 1, the apparatus arranged in accordance with the invention is situated along an articulated side rail 202 of a conventional convertible top 110, the apparatus preferably being duplicated at the other side of the car (not shown) such that a latching arrangement near opposite ends of the windshield header effects engagement and disengagement of convertible top 110 with the windshield header 112.

With reference to FIGS. 2–4, details of the assembly 100 of FIG. 1 are set forth with identical parts designated by the same reference numbers among the figures.

Assembly 100 is arranged as a modular unit for coupling to conventional articulated side rail 202 of convertible top 110. This modular construction permits installation of the unit in many different vehicle models. The module itself includes a simple generally flat mounting base 204 which is coupled to side rail 202 via a plurality of bolts such as shown at 206 and 208 in FIG. 2. A threaded bolt 206 is threadingly received in a longitudinal mounting boss 210 disposed on each side of the assembly, while a pair of threaded bolts 208 are threadingly received in a transverse mounting boss 212. Both bosses may be an integral part of the mounting base 204.

The driving element of the power latch assembly comprises a reversible electric motor 214. Motor 214 is preferably powered by the vehicle through the usual electrical connection to an alternator or battery in a manner well-known to those skilled in the art. An operator actuated switch (not shown) interconnects motor 214 with the automotive source of power to render the motor selectively operative in either of two rotative directions.

Motor 214 is coupled via a gear train 216 to a rotatable threaded spindle or shaft 218. Components of gear train 216, the main drive shaft of motor 214 and the threaded spindle 218 are all at least partially supported by transverse bosses 212 and 224, which also may be integral parts of the modular unit's mounting base 204. The end of spindle 218 remote from the gear train 216 is appropriately journaled in boss 222.

Threadingly engaging the rotatable threaded spindle 218 is a threaded drive nut 220. Rotation of nut 220 is prevented by a projection 221 thereon which is slidably received in a longitudinally extending channel 223 affixed to base 204. One advantage of this type of arrangement is that it cannot back drive. A drive link 226 is rotatively coupled between threaded drive nut 220 and a rotating element 228. As best seen from the cross sectional view of FIG. 4, nut 220 is pivotally coupled to a bifurcated end of drive link 226 via two shouldered bolts 227 and 229. The two arms of link 226 which are coupled to nut 220 merge as shown in FIG. 3 for pivotal connection to rotating element 228 via a shouldered bolt 244 and nut 245. Element 228 is in turn pivotally connected via a pivot pin 246 to an upwardly open channel-shaped guide block 230 affixed to base 204 and having a pair of identical transversely aligned cams 231 on the forward edges thereof. Element 228 is also pivotally connected, via a shouldered pivot pin 248 and a pair of nuts 249, to latch element 232.

Latch element 232 includes a substantially J-shaped keeper 234 which extends through an opening 250 in articulated side rail 202. Keeper 234 is shaped for latching engagement with a latch receiving flange portion 236 of an automotive windshield header 112. In conventional fashion, the convertible top header element 240 rests on a collapsible elastomeric seal assembly 242 associated with windshield header 112 in order to accommodate manufacturing tolerances and provide the necessary seal.

Both the threaded nut 220 and the keeper 234 of latch 232 are shown in both solid and phantom positions in FIG. 2. When nut 220 is at a left-most position along threaded shaft 218 as shown at 220P in FIG. 2, then the keeper 234 of latch 232 will be disposed in the fully disengaged or unlocked position shown in phantom lines at 234P. Hence it will be apparent to those skilled in the art that as threaded nut 220 moves along shaft 218 upon rotation of motor 214, latching or unlatching of keeper 234 of latch 232, as shown in the solid and phantom views of FIG. 2, is effected, depending on the direction of rotation of motor 214. The latch includes a main body portion, indicated at 232, which on one side supports keeper 234 and on the opposite side has a pair of follower elements, each having a follower surface 233 adapted to engage one of cams 231. The latch body is also configured to engage both cams 231.

The operation of the powered latch arrangement of the invention is best understood with reference to FIG. 2 and FIGS. 5A-5C.

Assuming that the convertible top 110 is latched as shown in the solid lines of keeper 234 engaging flange 236 in FIG. 2. Upon activating an appropriate switch (not critical to the arrangement of this invention and therefore not specifically shown), motor 214 is energized to rotate shaft 218 via gear train 216 to begin movement of threaded nut 220 from a right-most position shown in solid lines in FIG. 2 along shaft 218 in a direction toward the left as one views FIG. 2. As nut 220 traverses shaft 218 toward the left, keeper 234 will begin to withdraw from flange 236 as shown in FIG. 5A. It is to be noted that, in the illustrative embodiment, latch element 232 initially moves in a plane almost parallel to the plane of windshield 114 (FIG. 1) to effect unlatching. This direction of movement is a result of the engagement of latch body 232 on cams 231, the upper portions of which are generally parallel to the windshield to give the desired direction of movement. With reference to FIG. 5A, it will be seen that the translating motion of nut 220 is in the direction depicted by arrow 501.

FIG. 5B shows hook element 234 further retracted from flange 236 in an intermediate portion of the travel of nut 220 along shaft 218. At the position shown in FIG. 5B, follower surfaces 233 are about to engage the arcuate lower portions of cams 231.

As nut 220 reaches its left-most position along shaft 218, it will be seen that latch 232 is now being guided along the lower portions of cams 231 until it reaches its fully disengaged position shown in FIG. 5C where it completely clears header 112 to facilitate raising of the convertible top.

To reverse the process, i.e. to effect latching engagement of the convertible top with the windshield header, nut 220 is driven by motor 214 rotating shaft 218 such that nut 220 will move in the direction shown by arrow 502 of FIG. 5A. With movement toward the right as one views FIG. 2, it will be seen that link 226 will pull rotating element 228 in a clockwise direction to effect latching engagement of at least a portion of keeper 234 of latch 232 with the flange portion 236 of windshield header 238, with the final motion being in a direction to pull the top tightly against the header.

It is to be noted that one significant advantage of the cam arrangement described herein is that one can alter the shape of the cam for use of the modular power latching system with a variety of different model vehicles. Furthermore, the use of a hook-type keeper with a windshield header flange means that accurate alignment of the moving and fixed parts is not critical. This condition, in turn, eliminates the binding problems encountered in prior art arrangements when trying to automatically insert a pin or rod into a mating cavity.

The invention has been described with reference to the details of an exemplary embodiment. Those skilled in the art will recognize that there will be many alternative arrangements following the principles of the invention. For example, there are many types of reversible drive elements and linkage arrangements which may be utilized to impart the required rotational movement to an element such as 228.

The invention's scope and spirit are to be defined by the appended claims.

I claim:

1. Apparatus for effecting powered latching engagement and disengagement between relatively movable first and second members, the apparatus comprising:
   reversible drive means coupled to one of the first and second members;
   latch means having a substantially J-shaped keeper;
   latch engaging means associated with the other one of the first and second members and shaped for latching receipt of at least a portion of the J-shaped keeper; and
   linking means comprising a drive link having a first end coupled to the drive means, a rotating element pivotally attached to a second end of the drive link and to the latch means, and a guide block coupled to and providing a pivot point for the rotating element, the drive link operative in cooperation with the drive means to rotate the rotating element about the guide block to move the keeper into and out of latching engagement with the latch engaging means.

2. The apparatus of claim 1 wherein the reversible drive means comprises:
   a reversible electric motor;
   a threaded shaft coupled to said motor for rotation thereby; and
   a threaded nut threadingly engaging the threaded shaft, such that the threaded nut moves along the threaded shaft as the threaded shaft rotates.

3. The apparatus of claim 2 wherein the first end of the drive link is coupled to the threaded nut.

4. The apparatus of claim 1 wherein the first member comprises a windshield header of an automotive vehicle and wherein the second member comprises a convertible top of the automotive vehicle.

5. The apparatus of claim 2 wherein the first member comprises a windshield header of an automotive vehicle and wherein the second member comprises a convertible top of the automotive vehicle.

6. The apparatus of claim 3 wherein the first member comprises a windshield header of an automotive vehicle and wherein the second member comprises a convertible top of the automotive vehicle.

7. The apparatus of claim 1 wherein said guide block includes a cam surface disposed thereon adapted to engage a cam follower surface of said latch means to positively guide said latch means in engagement to and disengagement from said latch engaging means.

8. The apparatus of claim 1 wherein the power means and the latch are mountable within a side rail of the convertible top at a location near the moveable front portion thereof.

9. The apparatus of claim 7 wherein the path of said movement of said latch between engagement and disengagement is determined by the geometric shapes of said cam surface and said cam follower surface.

10. The apparatus of claim 7 wherein the latch is coupled to one of the first and second members for selective movement:
   (a) to a fully engaged position in which said latch engaging means is in full latching receipt of the keeper of said latch;
   (b) to a fully disengaged position in which said first and second members are free to be moved away from each other; and
   (c) to an intermediate position between said fully engaged and fully disengaged positions.

11. The apparatus of claim 10 wherein said cam surface fully engages a surface of the latch member body when the latch is in said fully engaged position, said cam surface engages a point of intersection of said latch member body surface and said cam follower surface when in said intermediate position, and said cam surface fully engages said cam follower surface when in said fully disengaged position.

12. The apparatus of claim 10 wherein the first member comprises a windshield header of an automotive vehicle and the second member comprises a convertible top of the automotive vehicle and wherein the latch moves in a plane substantially parallel to plane of the windshield when moving between said fully engaged and intermediate positions.

13. The apparatus of claim 10 wherein the first member comprises a windshield header of an automotive vehicle and the second member comprises a convertible top of the automotive vehicle and wherein the latch moves in a plane substantially transverse to a plane of the windshield when moving between said intermediate and fully disengaged positions.

14. Apparatus for effecting powered latching engagement and disengagement between, a header of an automotive windshield and a movable front portion of a convertible top, the apparatus comprising;
   a latch having a substantially J-shaped keeper;
   a latch element associated with one of the windshield header and the movable front potion of the convertible top and shaped for latching receipt of at least a portion of the J-shaped keeper; and
   powered means associated with the other one of the windshield header and the movable front portion of the convertible top for moving the keeper into and out of engagement with the latch element, the powered means comprising a reversible electric motor, a threaded shaft coupled to said motor for rotation thereby, a threaded nut threadingly engaging the threaded shaft such that the nut moves along the threaded shaft as the shaft rotates, a drive link having a first end coupled to the threaded nut, a rotating element coupled to a second end of the drive link and to the latch, and a guide block coupled to and providing a pivot point for the rotating element, the drive link operative upon movement of the threaded nut in the first direction along the threaded shaft to rotate the rotating element about the pivot point in a direction causing the latch to move away from the latch element, the drive link also operative upon movement of the threaded nut in a second direction along the threaded shaft to rotate the rotating element about the pivot point in a direction causing the latch to move toward the latch element.

15. The apparatus of claim 14 wherein the power means and the latch are mountable within a side rail of the convertible top at a location near the movable front portion thereof.

16. The apparatus of claim 15 wherein the latch moves in a plane substantially transverse to a plane of the windshield.

17. The apparatus of claim 14 wherein the rotating element is pivotally connected to said second end of the drive link.

18. The apparatus of claim 14 wherein the rotating element is pivotally connected to said latch.

19. The apparatus of claim 14 wherein the power means and the latch are at least partially supported by a mounting base.

20. The apparatus of claim 19 wherein said base has a channel portion disposed thereon and said threaded nut includes a protrusion thereon which slidably engages said channel to prevent rotational movement of said nut.

21. The apparatus of claim 14 wherein movement of the threaded nut in said first direction is movement of said nut away from said motor.

22. The apparatus of claim 21 wherein movement of the threaded nut in said second direction is movement of said nut toward said motor.

* * * * *